United States Patent
Revach et al.

(10) Patent No.: US 11,043,801 B2
(45) Date of Patent: Jun. 22, 2021

(54) HYBRID VEHICLE WITH ELECTRICAL POWER OUTLET

(71) Applicant: Ford Global Technologies, LLC, Dearborn, MI (US)

(72) Inventors: Shlomo Revach, Ypsilanti, MI (US); Duane M. Grider, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 16/155,286

(22) Filed: Oct. 9, 2018

(65) Prior Publication Data

US 2020/0112163 A1 Apr. 9, 2020

(51) Int. Cl.
| | |
|---|---|
| *H02H 3/16* | (2006.01) |
| *H01H 71/70* | (2006.01) |
| *H01H 71/02* | (2006.01) |
| *B60K 6/26* | (2007.10) |
| *B60L 1/00* | (2006.01) |
| *B60L 3/04* | (2006.01) |
| *B60L 50/51* | (2019.01) |
| *H01R 27/02* | (2006.01) |

(52) U.S. Cl.
CPC ............... *H02H 3/165* (2013.01); *B60K 6/26* (2013.01); *B60L 1/006* (2013.01); *B60L 3/04* (2013.01); *B60L 50/51* (2019.02); *H01H 71/02* (2013.01); *H01H 71/70* (2013.01); *B60L 2210/40* (2013.01); *B60Y 2200/92* (2013.01); *B60Y 2400/604* (2013.01); *B60Y 2400/61* (2013.01); *H01R 27/02* (2013.01); *H01R 2201/26* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,198,908 A | * | 8/1965 | Staak | H01H 3/264 318/475 |
| 3,236,995 A | * | 2/1966 | Fibikar | G01M 1/22 219/86.24 |
| 3,629,744 A | * | 12/1971 | Maier | H01H 3/264 335/89 |
| 3,725,830 A | * | 4/1973 | Rigert | H01H 75/04 335/32 |
| 3,849,616 A | * | 11/1974 | Teijeiro | H01H 33/904 200/82 R |
| 3,883,781 A | * | 5/1975 | Cotton | H01H 71/46 361/37 |
| 5,808,532 A | * | 9/1998 | DiVincenzo | H01H 71/70 200/400 |
| 6,912,889 B2 | | 7/2005 | Staphanos | |

(Continued)

FOREIGN PATENT DOCUMENTS

JP 2012243424 A * 12/2012

*Primary Examiner* — Adam D Houston
(74) *Attorney, Agent, or Firm* — David B. Kelley; Brooks Kushman P.C.

(57) ABSTRACT

A hybrid vehicle includes a power bus electrically connected to an inverter and an electrical socket electrically connected to the power bus. A ground fault circuit interrupter (GFCI) is electrically connected between the power bus and the socket. The GFCI has a circuit breaker with a mechanical reset. An actuator arrangement is configured to actuate the mechanical reset to reset the circuit breaker.

20 Claims, 9 Drawing Sheets

(56) References Cited

U.S. PATENT DOCUMENTS

| | | | |
|---|---|---|---|
| 8,489,363 B2 | 7/2013 | Piccirillo et al. | |
| 8,868,378 B2 | 10/2014 | Batzler et al. | |
| 9,013,062 B2 | 4/2015 | Kinomura | |
| 9,616,762 B2 | 4/2017 | Yamamoto | |
| 9,884,562 B2 | 2/2018 | Yamamoto | |
| 10,501,032 B2* | 12/2019 | Secord | B60R 16/03 |
| 10,730,447 B1* | 8/2020 | Hemphill | E05C 7/02 |
| 2002/0158724 A1* | 10/2002 | Wellner | H01H 71/04 335/16 |
| 2002/0158725 A1* | 10/2002 | Nerstrom | H01H 73/14 335/17 |
| 2002/0158726 A1* | 10/2002 | Wellner | H01H 73/56 335/18 |
| 2005/0162243 A1* | 7/2005 | Eberts | H01H 3/46 335/68 |
| 2006/0152867 A1* | 7/2006 | Bonasia | H02H 3/335 361/42 |
| 2006/0163049 A1* | 7/2006 | Puhalla | H01H 71/465 200/330 |
| 2006/0193092 A1* | 8/2006 | Huang | H01H 83/04 361/42 |
| 2007/0159748 A1* | 7/2007 | Sullivan | B66B 1/06 361/93.1 |
| 2008/0291592 A1* | 11/2008 | Zols | H01H 9/54 361/63 |
| 2009/0029227 A1* | 1/2009 | Patton | H01M 16/006 429/416 |
| 2009/0212967 A1* | 8/2009 | Bonasia | H02H 3/335 340/4.32 |
| 2010/0066302 A1* | 3/2010 | Gregg | B60W 20/13 320/104 |
| 2010/0133900 A1* | 6/2010 | King | B60L 55/00 307/9.1 |
| 2010/0187029 A1* | 7/2010 | Young | B60K 6/46 180/65.31 |
| 2010/0238611 A1* | 9/2010 | DeBoer | H01H 71/02 361/634 |
| 2010/0270136 A1* | 10/2010 | Wolfe | H01H 33/022 200/17 R |
| 2011/0313587 A1* | 12/2011 | Lin | H02H 3/207 700/296 |
| 2012/0139335 A1* | 6/2012 | Holland | B60L 58/15 307/9.1 |
| 2012/0244398 A1* | 9/2012 | Youngs | B60L 58/20 429/61 |
| 2013/0098027 A1* | 4/2013 | Le Roux | F02G 1/02 60/512 |
| 2013/0154561 A1* | 6/2013 | Gadh | B60L 53/14 320/109 |
| 2014/0163664 A1* | 6/2014 | Goldsmith | A61B 17/12181 623/1.11 |
| 2014/0218139 A1* | 8/2014 | Kubisa | H01H 71/68 335/14 |
| 2014/0240902 A1 | 8/2014 | Burch | |
| 2014/0251769 A1* | 9/2014 | Chen | H01H 71/1054 200/43.16 |
| 2014/0277783 A1* | 9/2014 | Knuth | H04Q 9/00 700/286 |
| 2014/0278157 A1* | 9/2014 | Simonin | H02H 3/02 702/58 |
| 2015/0123751 A1* | 5/2015 | Lee | H01H 3/222 335/22 |
| 2016/0009232 A1* | 1/2016 | Budny | B25H 3/02 206/373 |
| 2016/0091217 A1* | 3/2016 | Verberkt | H04L 67/025 700/276 |
| 2016/0380424 A1* | 12/2016 | Aromin | H01H 9/0228 361/50 |
| 2017/0025886 A1* | 1/2017 | Rohmer | H02J 7/0044 |
| 2017/0070090 A1* | 3/2017 | Miller | H01R 13/6683 |
| 2017/0169979 A1* | 6/2017 | Mittelstadt | H01H 71/40 |
| 2017/0237266 A1* | 8/2017 | Hatakeyama | H02J 4/00 307/24 |
| 2017/0256941 A1* | 9/2017 | Bowers | H02J 13/0006 |
| 2018/0038633 A1* | 2/2018 | Buttolo | B60H 1/00 |
| 2018/0072252 A1* | 3/2018 | Collins | B60R 16/0238 |
| 2018/0315557 A1* | 11/2018 | Aromin | H01R 13/7135 |
| 2018/0321318 A1* | 11/2018 | Miller | H02H 3/28 |
| 2019/0008090 A1* | 1/2019 | Dretzka | A01D 34/001 |
| 2019/0013766 A1* | 1/2019 | Stach | H02J 7/35 |
| 2019/0020156 A1* | 1/2019 | Smith | G05F 3/02 |
| 2019/0041461 A1* | 2/2019 | Reid | G01R 31/3277 |
| 2019/0084506 A1* | 3/2019 | Gutierrez | F02N 11/0807 |
| 2019/0148891 A1* | 5/2019 | Smith | H05K 5/03 174/66 |
| 2019/0148929 A1* | 5/2019 | Wang | H02H 3/162 361/42 |
| 2019/0187201 A1* | 6/2019 | Gonzalez | H02M 1/32 |
| 2019/0189379 A1* | 6/2019 | Ostrovsky | H01H 71/64 |
| 2019/0225051 A1 | 7/2019 | Zenner et al. | |
| 2019/0229478 A1* | 7/2019 | Iaconis | H02G 3/12 |
| 2019/0270382 A1* | 9/2019 | Pfizenmaier | B60L 3/0069 |
| 2019/0341766 A1* | 11/2019 | Aromin | H01H 13/14 |
| 2020/0014206 A1* | 1/2020 | Haartsen | H01R 13/6683 |
| 2020/0035436 A1* | 1/2020 | Packard | H01H 83/04 |
| 2020/0055473 A1 | 2/2020 | Ferrel et al. | |
| 2020/0076217 A1* | 3/2020 | Filippi | B60L 53/22 |
| 2020/0083013 A1* | 3/2020 | Fasano | H01H 83/04 |
| 2020/0083502 A1* | 3/2020 | Fan | H01M 10/482 |
| 2020/0086743 A1* | 3/2020 | Jala | H02H 3/025 |
| 2020/0108819 A1* | 4/2020 | Revach | B60W 20/13 |
| 2020/0112163 A1* | 4/2020 | Revach | H01H 71/70 |
| 2020/0122585 A1* | 4/2020 | Bhat | H01H 47/001 |
| 2020/0212959 A1* | 7/2020 | Eriksen | H01R 13/7135 |
| 2020/0264234 A1* | 8/2020 | Miller | G01R 31/3277 |

\* cited by examiner

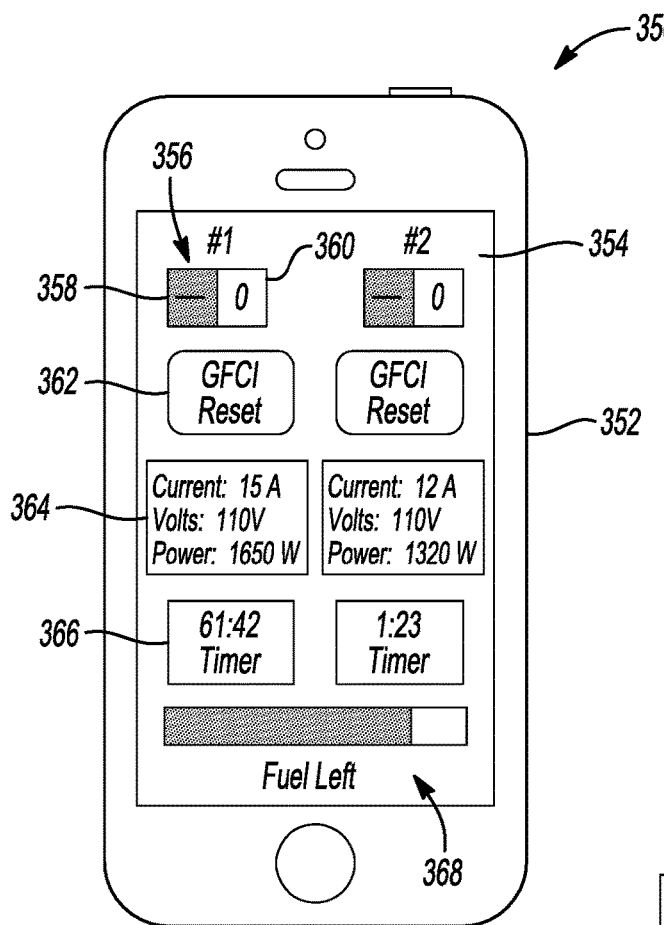
_Fig-10_
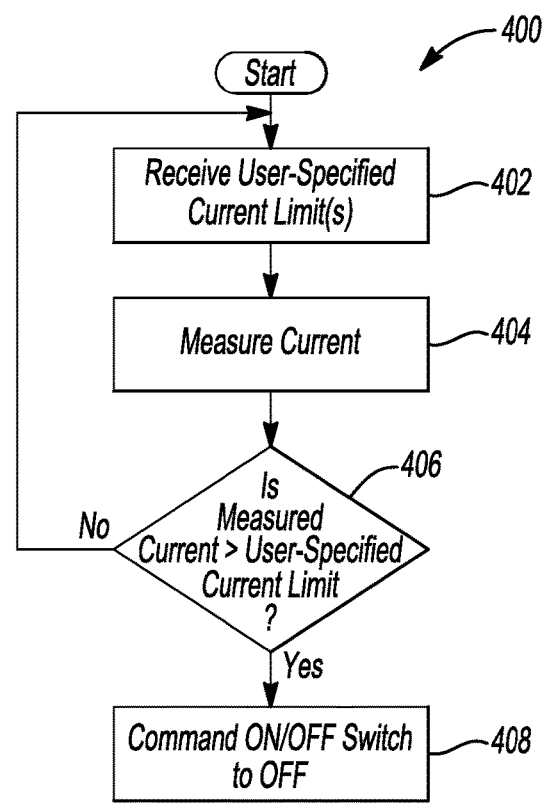
_Fig-11_

US 11,043,801 B2

HYBRID VEHICLE WITH ELECTRICAL POWER OUTLET

TECHNICAL FIELD

This disclosure relates to hybrid vehicles with capacity to act as mobile generators and more specifically to vehicles that include electrical power sockets connected to a power bus of an electrified powertrain.

BACKGROUND

A hybrid-electric powertrain includes an engine and an electric machine. The torque (or power) produced by the engine and/or the electric machine can be transferred through a transmission to the driven wheels to propel the vehicle. A traction battery supplies energy to the electric machine.

SUMMARY

According to one embodiment, a hybrid vehicle includes a power bus electrically connected to an inverter and an electrical socket electrically connected to the power bus. A ground fault circuit interrupter (GFCI) is electrically connected between the power bus and the socket. The GFCI has a circuit breaker with a mechanical reset. An actuator arrangement is configured to actuate the mechanical reset to reset the circuit breaker.

According to another embodiment, a hybrid vehicle includes a power bus electrically connected to an inverter and an electrical socket electrically connected to the power bus. A ground fault circuit interrupter (GFCI) is electrically connected between the power bus and the socket. An actuator is configured to reset the GFCI. A vehicle controller is programmed to, responsive to a request to reset the GFCI, command the actuator to reset the GFCI.

According yet another embodiment, a hybrid vehicle includes a power bus electrically connected to an inverter and a socket electrically connected to the power bus. A ground fault circuit interrupter (GFCI) is electrically connected between the power bus and the socket. The GFCI has a mechanical reset and an actuator arrangement configured to operate the mechanical reset. A vehicle controller is programmed to, responsive to a request to reset the GFCI, command the actuator arrangement to operate the mechanical reset.

BRIEF DESCRIPTION OF THE DRAWINGS

FIG. 10 illustrates a mobile device application for an auxiliary power system.

FIG. 11 is a flow chart illustrating controls/method for controlling current of a socket of an auxiliary power system.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
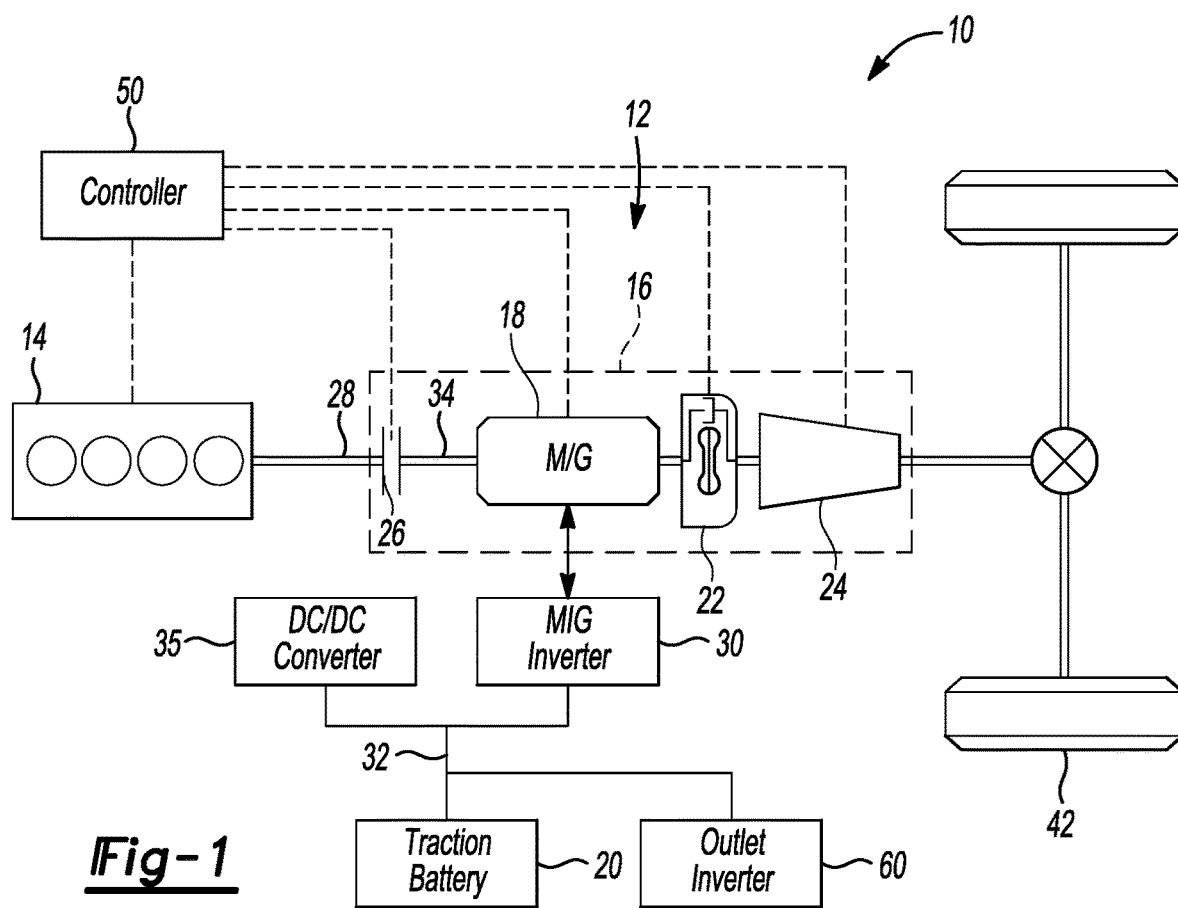
FIG. 1 is a schematic diagram of a hybrid vehicle having an auxiliary power system.

Referring to FIG. 1, a schematic diagram of a hybrid-electric pickup truck 10 is illustrated according to an embodiment of the present disclosure. The pickup truck 10 includes an auxiliary power system that allows the truck 10 to be used as a mobile generator. FIG. 1 illustrates representative relationships among the components. Physical placement and orientation of the components within the vehicle may vary. The truck 10 includes a powertrain 12. The powertrain 12 may include an engine 14 that drives a transmission 16, which may be referred to as a modular hybrid transmission (MHT). As will be described in further detail below, the transmission 16 may include an electric machine such as an electric motor/generator (M/G) 18, an associated traction battery 20, a torque converter 22, and a multiple step-ratio automatic transmission or gearbox 24. For simplicity, the M/G 18 may be referred to as a motor. The engine 14, M/G 18, torque converter 22, and the gear box 24 may be connected sequentially in series, as illustrated in FIG. 1.

The engine 14 and the M/G 18 are both drive sources for the truck 10 and may be referred to as actuators. The engine 14 generally represents a power source that may include an internal-combustion engine such as a gasoline, diesel, or natural gas engine. The engine 14 generates engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor.

The M/G 18 is powered by a traction battery 20. The traction battery 20 stores energy in a plurality of individual battery cells connected together to provide a desired voltage and charge capacity for the M/G 18. In one embodiment, traction battery 20 includes an array of lithium-ion battery cells. The traction battery 20 typically provides a high-voltage direct current (DC) output to a high-voltage bus 32, although the voltage and current may vary depending on particular operating conditions and loads. The traction battery 20 is electrically connected to an M/G power inverter 30, and a DC/DC converter 35, for example. The power inverter 30 converts DC power from the battery to AC power for use with the electric machines. For example, power electronics may provide three-phase alternating current (AC) to the M/G 18. The power inverter 30 is also capable of acting as a rectifier. The DC/DC converter 35 is configured to convert the high-voltage DC output of the traction battery 20 to a low-voltage DC supply that is compatible with other vehicle loads that may be directly connected thereto. The inverter 30 may include an inductor configured to step-up or step down current and voltage.

One or more contactors may isolate the traction battery 20 from other components when open and connect the traction battery 20 to the other components when closed. The traction battery 20 may include various internal circuits for measuring and monitoring various operating parameters including cell current and individual cell voltage. Parameters such as voltage, current and resistance for a battery cell or a group of battery cells (sometimes referred to an array) may be monitored and/or controlled by a vehicle controller 50.

Vehicle 10 may also include an auxiliary battery having a relatively lower nominal voltage (such as 24V or 48V, for example) and may be implemented using different battery chemistries than the traction battery 20. The auxiliary battery may also be referred to as a low-voltage battery, starter battery or simply the vehicle battery for various applications. The auxiliary battery may be used to power various low-voltage components, controllers, modules, motors, actuators, sensors, etc.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 34 into electrical energy to be stored in the battery 20 or used by vehicle systems such as an auxiliary electrical system. The disconnect clutch 26 can also be disengaged to isolate the engine 14 from the remainder of the powertrain 12 such that the M/G 18 can act as the sole drive source for the truck 10. The M/G 18 is continuously, drivably connected to the shaft 34, whereas the engine 14 is drivably connected to the shaft 34 only when the disconnect clutch 26 is at least partially engaged. When the disconnect clutch 26 is locked (fully engaged), the crankshaft 28 is fixed to the shaft 34.

The vehicle 10 includes an outlet power inverter 60 connected to the high voltage bus 32. The inverter 60 is configured to converter the DC power of the bus 32 to AC power that is compatible with the auxiliary power system. The inverter 60 is also configured to stepdown the voltage of the bus 32 to voltages compatible with the auxiliary power system such as common wall voltages 120 and/or 240.

It should be understood that the schematic illustrated in FIG. 1 is merely exemplary and is not intended to be limiting. Other series-hybrid configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Further, the truck 10, in other embodiments, may include a parallel-hybrid configured (also known as a split hybrid).

The vehicle 10 includes one or more controller 50 such as a powertrain control unit (PCU), an engine control module (ECM), a motor control unit (MCU), and a DC/AC inverter controller (DCACA). While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller" that controls various actuators in response to signals from various sensors to control functions. Controller 50 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller 50 within each of the subsystems identified above.

Pickup trucks are frequently used on constructions sites as well as at the home by contractors and individuals. Construction sites typically require electricity to power tools and the like. Available power sources, however, are often scarce. Therefore, mobile gas generators are commonly bought onto construction sites. These mobile generators are bulky, take-up storage space, and are difficult to move. Providing electrical power with a drivable vehicle overcomes many limitations of mobile gas generators. While vehicles are available with AC outlets, their 12-volt batteries have limited capacity as do their alternators. The vehicle 10, in contrast, has a large traction battery 20 and an M/G 18, which allows the vehicle to act as a mobile generator for powering auxiliary loads, such as power tools and the like, for an extended period of time.

Figure 3:
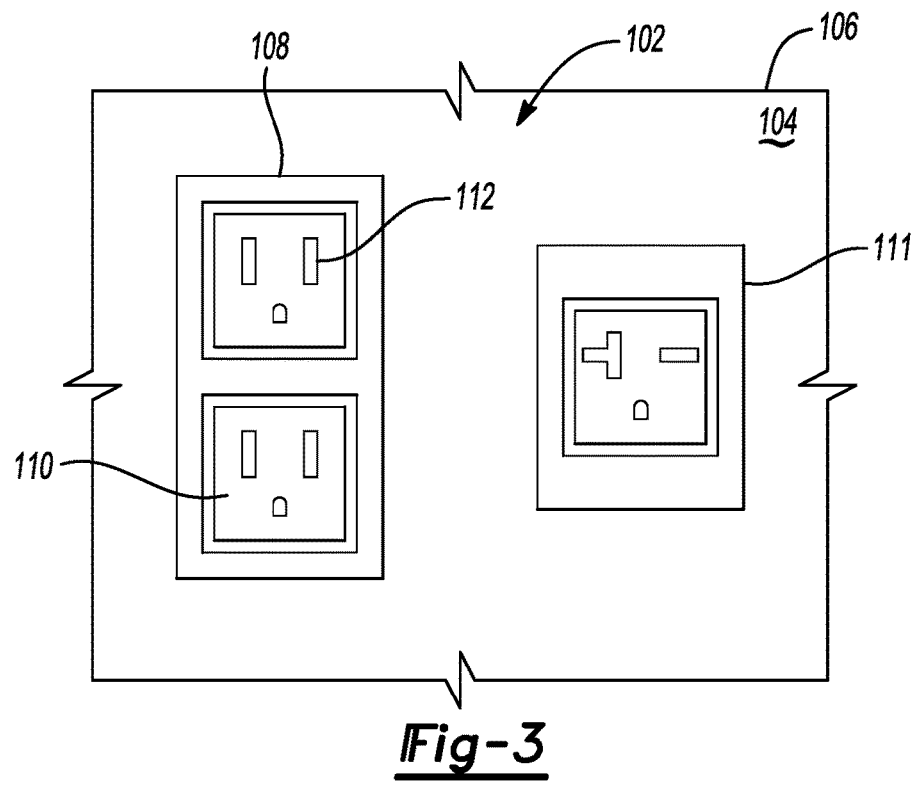
FIG. 3 is a zoomed-in view of an electrical outlet.
Figure 2:
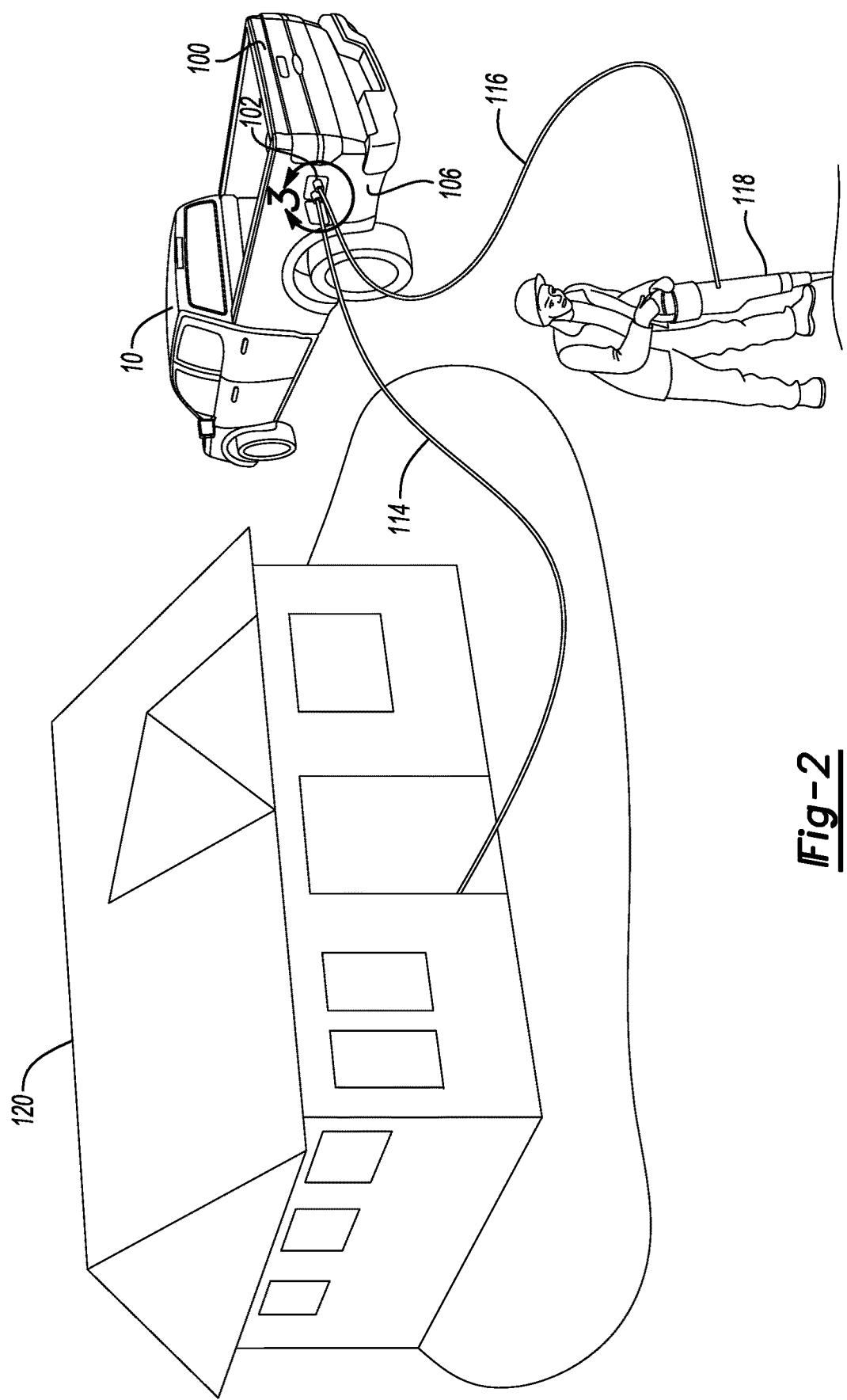
FIG. 2 is a schematic diagram of a hybrid vehicle powering loads with an auxiliary power system.

Referring to FIGS. 2 and 3, the truck 10 includes an open cargo box 100 having a pair of opposing sidewalls 106 and a tailgate extending between the sidewall. The truck 10 has an auxiliary power system that includes one or more outlets configured to power electrical loads such as power tools. An electrical outlet 102 is disposed on the box 100. For example, the outlet 102 is mounted on an outer surface 104 of the sidewall 106. Alternatively, the outlet 102 may be mounted on the inner surface of the sidewall 106. The electrical outlet 102 may include one or more electrical sockets. The sockets may have different voltage and current ratings so that different loads can be powered by the vehicle 10. For example, the outlet 102 may include two 120-volt sockets 108, 110 each having three receptacles 112, e.g., hot, neutral, and ground, configured to receive a standard wall plug of an electrical load, such as a power tool. The outlet 102 may also include one or more 240-volt socket 111 for powering other types of loads such as a welder, a power saw, an electric pump, and the like. (It is to be understood that the voltage rating of the socket is a design voltage and that actual voltage at the socket may be more or less within a tolerance.) The electrical sockets are electrically connected to a power bus of the vehicle as will be described in more detail below. The sockets are configured to receive standard power cords, e.g., extension cords 114 and 116, to power external devices with the truck 10. In the illustrated embodiment, the extension cord 114 is plugged in the 240-volt socket 111 and is being used to power a house 120 and the extension cord 116 is plugged into socket 108 and is being used to power a drill 118.

The bed outlet 102 is merely an example and the bed outlet may include more or less sockets in other embodiments. Additional outlets may also be provided in other areas of the vehicle 10 such as in the passenger cabin. For example, an outlet may be provided on the front dash, in the front console, and/or in the rear console. The number and type of outlets and sockets may vary based on the power capability of the hybrid powertrain. For example, a 2-kilowatt system may include two 120-volt sockets whereas a 7-kilowatt system may include four 120-volt sockets and one 240-volt socket or six 120-volt sockets.

Figure 4:
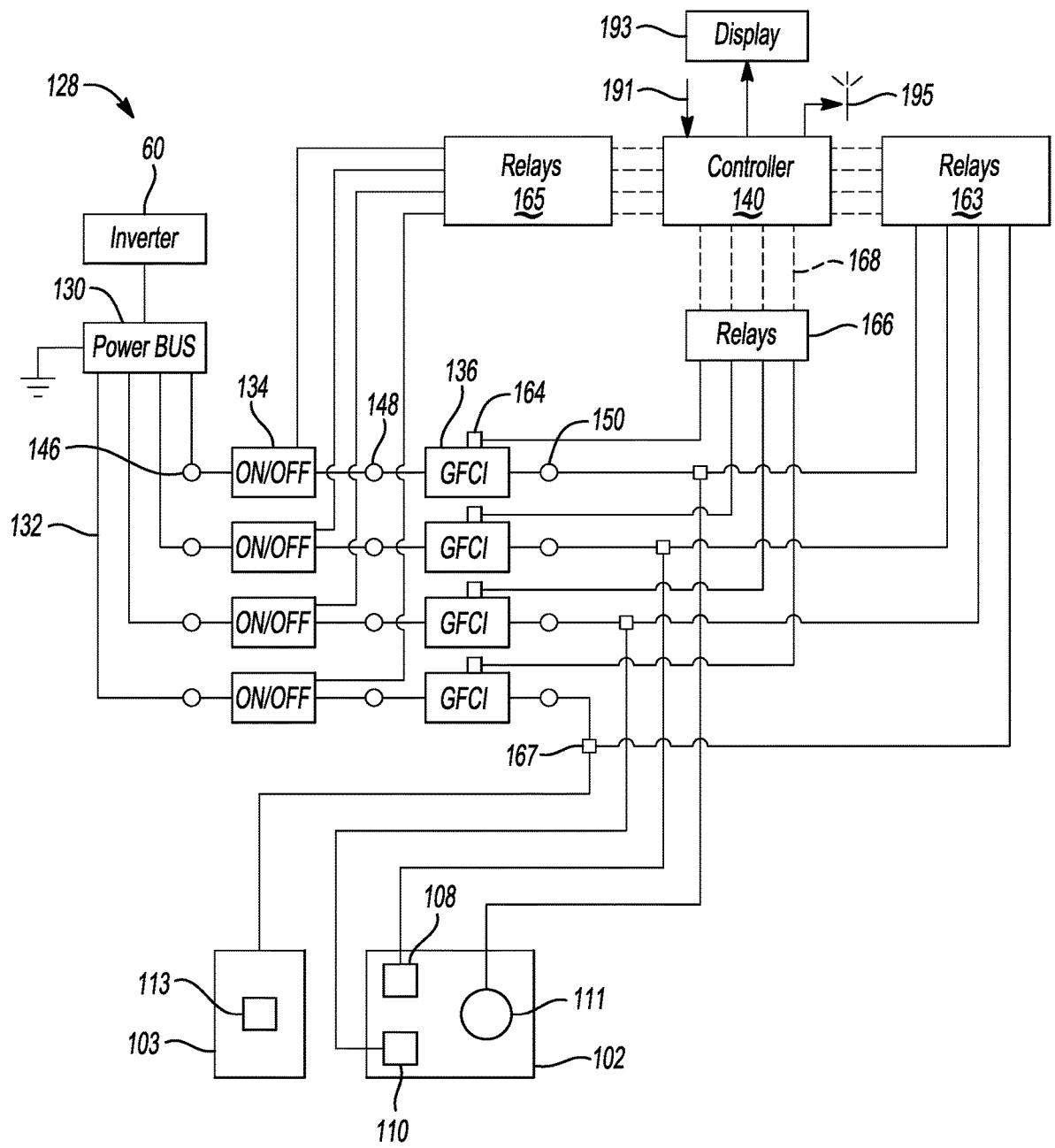
FIG. 4 illustrates an example auxiliary power system.

FIG. 4 illustrates an example circuit for an auxiliary power system 128. The sockets 108, 110, 111, and 113 of the auxiliary power system 128 are arranged in a first outlet 102 located on the box 100 and a second outlet 103 located within a cab of the truck 10. The sockets are electrically connected with a power bus 130 that receives power from the inverter 60. The power inverter 60 is configured to receive power from the traction battery 20, the M/G 18, or both, which allows the vehicle 10 to power the sockets with a plurality of power sources. The sockets may be electrically connected with the power bus 130 through one or more conduits, e.g., wires 132, and intermediate electrical devices. For example, the system 128 may include one or more ON/OFF switches 134 and at least one ground fault circuit interrupter (GFCI) 136. In the illustrated embodiment, each socket has its own electrical conduit 132, ON/OFF switch 134, and GFCI 136.

The GFCI 136 is a safety device designed to protect a user from receiving electric shocks from faults in the electrical devices by comparing the input current on the hot side to the output current on the neutral side. Unlike a fuse or circuit, which protects the circuitry from excessive current, the GFCI 136 protects people from electric shock caused by an electrical fault such as a ground fault, short-circuit, installation failure, and the like. While not illustrated, the circuit may include one or more fuses and/or circuit breakers to protect against excessive current draw.

The ON/OFF switches 134 allows the user, or the truck 10, to selectively provide power to the sockets. While illustrated as multiple ON/OFF switches, in some embodiments sockets may share ON/OFF switches and GFCIs. The ON/OFF switch 134 may be electronically controlled by a controller 140, which may include a DCACA. For example, a relay set 165 can be controlled by the controller 140 to actuate the ON/OFF switches 134. Alternatively, the ON/OFF switch may be a manual switch located on the truck box 100, in the cab, or another suitable location. Providing an electronic switch 134 is advantageous as it allows the user to actuate the ON/OFF switch in a variety of ways, such as via a button within the cab or remotely via a remote device such as a cell phone. The electronic switch 134 may include an associated relay that controls operation of the switch 134 according to signals from the controller.

The system 128 may include a plurality of voltage and current sensors. These sensors may be packaged together as shown schematically by circles. For example, each socket may include at least one dedicated sensor that outputs current and/or voltage measurements for that socket. The sensors are in communication with the controller 140 and are configured to output signals indicative of measured current and/or voltage.

A first set of sensors 146 may be disposed between the power bus 130 and the ON/OFF switches 134 and can be used to determine if power is being delivered to the ON/OFF switches 134. A second set of sensors 148 may be disposed between the ON/OFF switches 134 and the GFCIs 136 and can be used to determine if power is being delivered to the GFCIs 136. Comparing readings from sensors 146 and 148 may be used to determine that switch 134 is functioning properly. A third set of sensors 150 may be disposed between the GFCIs 136 and the outlets 102, 103 and can be used to determine if power is being delivered to the sockets. The controller uses information from the sensors to determine operation states of the system 128. For example, the controller can compare voltage signals from the various sensors to determine if the GFCIs 136 are tripped, the ON/OFF switches 134 is operating properly, if the outlets 102, 103 have power, and the like.

Figure 5:
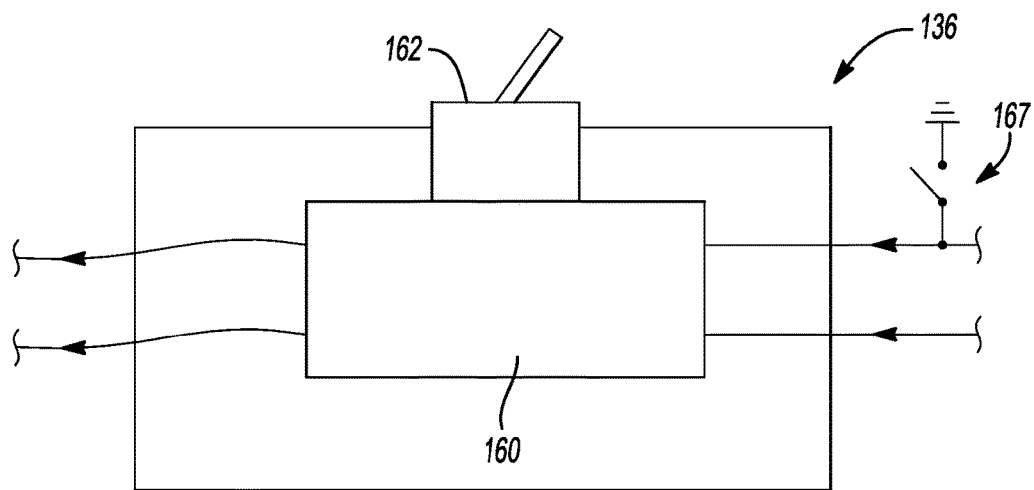
FIG. 5 is a diagrammatical view of a ground fault circuit interrupter (GFCI) of an auxiliary power system.

Referring to FIG. 5, an example GFCI 136 includes a circuit breaker 160 configured to interrupt electrical power in response to an electrical fault being detected. The GFCI 136 may include a sense circuit configured to open contacts within the circuit breaker 160 responsive to an imbalance between outgoing and incoming current being detected. Circuit breaker 160 must be reset following a trip event. The GFCI may 136 include a mechanical reset 162 that is actuatable to reset the circuit breaker 160. The mechanical reset 162 may be a button, a switch, a toggle, or the like.

Referring back to FIG. 4, unlike a typical GFCI, the GFCI 136 can be reset remotely. An electronically controlled actuator arrangement 164 is configured to actuate the mechanical reset 162 to remotely reset the circuit breaker 160. The actuator arrangement 164 may include an electric actuator that engages with the mechanical reset 162 to actuate the reset 162. The electric actuator may be an electric motor, a solenoid, or the like. The actuator arrangement 164 allows a user, who is distant from the vehicle 10, to reset the GFCI 136 without returning to the vehicle 10. The system 128 may include relays 166 that control power to the actuator arrangement 164. The relays 166 are in electronic communication with the controller 140 and each is configured to receive a signal 168 that commands the relay closed to power the actuator arrangement 164. The controller 140 may issue the signal 168 in response to receiving a reset request from the user via a remote device or an in-vehicle human machine interface (HMI), e.g., a button, a touch screen, voice command, etc. The system 128 may also include switches 167 that are used to test the GFCIs. The test switches 167 may be controlled by relays 163.

Figure 6:
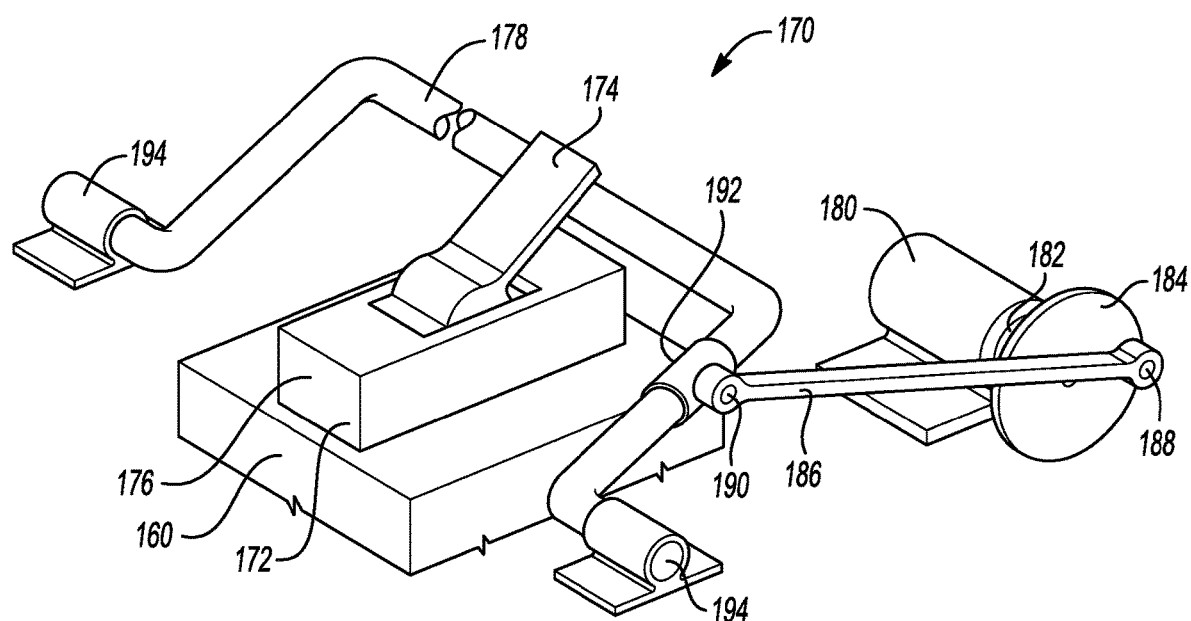
FIG. 6 is a diagrammatical view of an actuator arrangement for resetting a GFCI.

FIG. 6 illustrates an example actuator arrangement 170 suitable for use with a toggle-type mechanical reset 172. The mechanical reset 172 includes a toggle 174 that is pivotal relative to a base 176. The circuit breaker 160 of the GFCI 136 is reset by pivoting the toggle 174 from a tripped position (shown) to an active position (not shown). The toggle 174 may be actuated by a pivoting arm 178 that is driven by an electric motor 180. Pulse width modulation may be used to control the motor 180. The electric motor 180 may include an output shaft 182 having an output plate 184 attached thereto. A rod 186 connects between the arm 178 and the output plate 184. A first end 188 of the rod is eccentrically connected to the plate 184 and a second end 190 is slidably connected to the arm 178. The second end 190 may be slidably connected by a sleeve 192. The eccentric connection transforms circular motion of the shaft 182 into reciprocating motion in the rod 186 to pivot the arm 178 about a pivot point 194. The pivoting arm 178 engages with the toggle 174 to pivot the toggle to the active position, which resets the circuit breaker 160. In some embodiments, each GFCI may include a dedicated reset mechanism or a single resent mechanism may be configured to reset multiple GFCI. For example, the arm 178 may be arranged to engage with toggles 174 of multiple GFCIs.

The controller 140 controls the electric motor 180 via a relay 166. The controller 140 may be programmed to energize the electric motor 180 such that the output shaft 182 starts and stops at the shown position each time the motor 180 is activated, that is, the motor 180 completes one rotation for each activation event. This ensures that the arm 178 returns to the shown position to not interfere with a movement path of the toggle 174 so that the GFCI 136 can properly trip.

Figure 7:
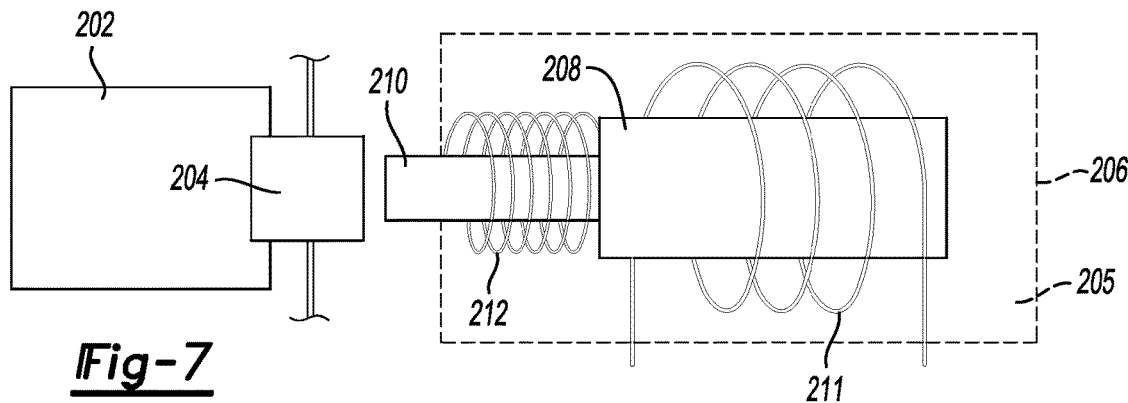
FIG. 7 is a diagrammatical view of another actuator arrangement for resetting a GFCI.

FIG. 7 illustrates another actuator arrangement 200 for use with a button-type mechanical reset 202. The reset 202 includes a movable button 204 that is depressed to reset the circuit breaker of the GFCI 136. The button 204 may be actuated by a solenoid 205. The solenoid 205 may include a case 206 that houses an armature 208 and an electric coil 211. The armature 208 is configured to move out of the case 206 towards the button 204 responsive to an electric field being generated in the coil 211. An arm 210 may be connected with the armature 208 and engages with the button 204 to reset the GFCI 136. A resilient member, such as a coil spring 212, may retract the arm 210 into the case 206.

Referring back to FIG. 4, a user may interact with the auxiliary power system 128 via a plurality of different human machine interfaces. Some of the interfaces may be on or in the vehicle 10 and others may be remote. In-vehicle HMIs may include touchscreens, buttons, switches, keypads, voice controls, and the like. The touch screens may be on the vehicle dash such as the radio head or the instrument panel. The HMI may also be an application running on a remote device, e.g., a cell phone, connected to the vehicle. The remote device allows the auxiliary power system 128 may be remotely controlled by a user working away from the vehicle 10.

The HMIs allow the user to control various aspects of the auxiliary power system 128 such as actuating the ON/OFF switches 134, resetting the GFCIs 136, setting current limits for the sockets, setting timers, prioritizing sockets, and the like. The HMIs also provide information about the system 128 to the user. The controller 140 may include inputs 191 from other vehicle controllers and sensors and output information to the HMIs. For example, the inputs 191 may include signals indicative of fuel level, engine temperature, engine states, generator temperature, battery state of charge, and others. The controller 140 may output information to at least one in-vehicle display 193 and an antenna 193 that sends the information to a remote device. The output information may include fuel level, engine temperature, engine states, generator temperature, battery state of charge, ON/OFF states of the switches 134, states of GFCIs 136, current draw of the sockets, power draw at each socket, total power draw, time to empty, timer status, warnings, and diagnostics.

Figure 8:
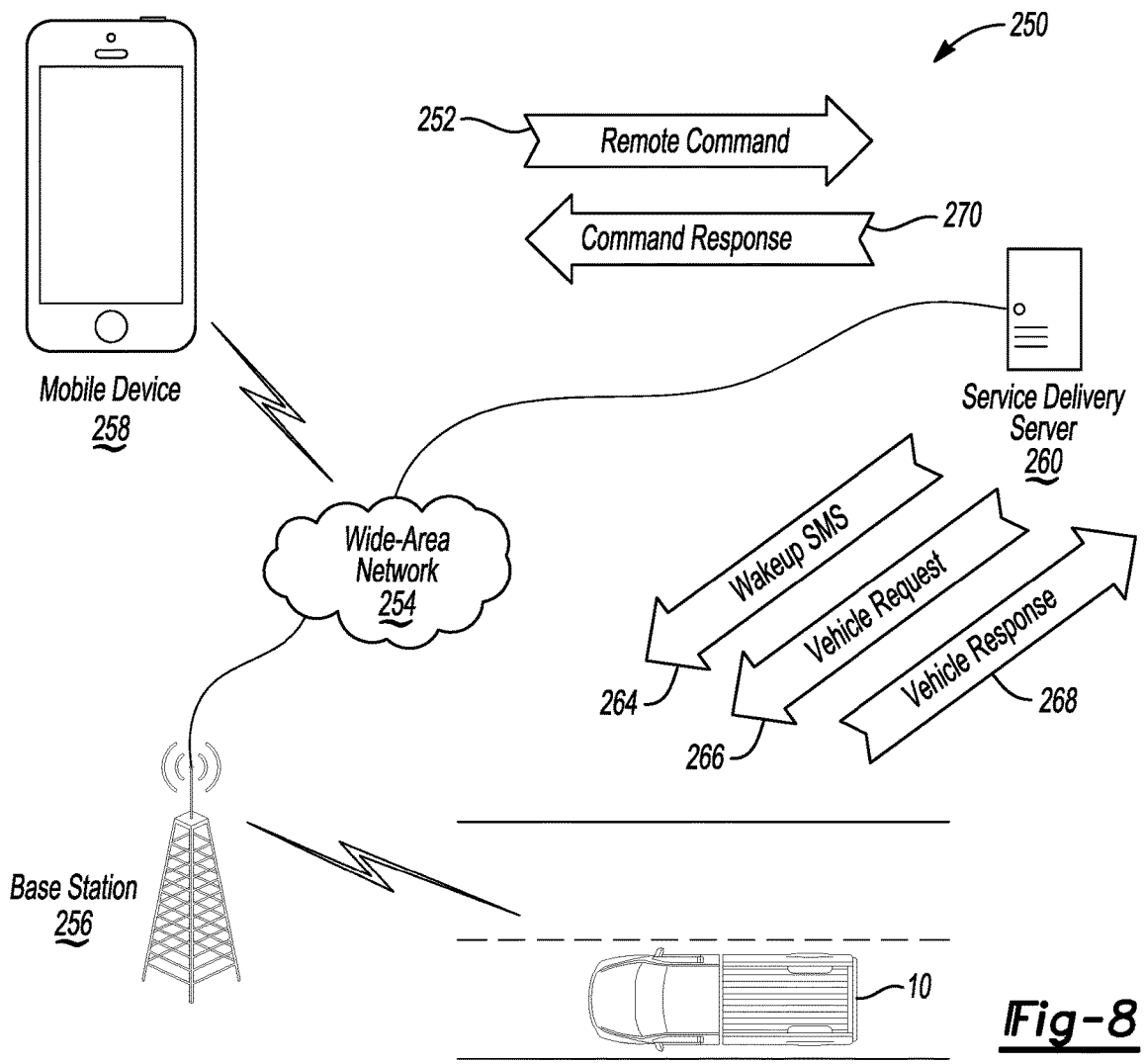
FIG. 8 illustrates an example system for processing remote commands by a vehicle.

FIG. 8 illustrates an example system 250 for processing remote commands 252 by the vehicle 10. As shown, the system 250 includes the vehicle 10 in communication with a wide-area network 254. The vehicle 10 is configured to wirelessly communicate with base stations 256 connected to the wide-area network 254. Only one base station 256 is shown for clarity, but it should be noted that systems 250 typically include many base stations 256 arranged to cover a large geographical area. While an example system 250 is shown in FIG. 8, the example components as illustrated are not intended to be limiting. Indeed, the system 250 may have more or fewer components, and additional or alternative components and/or implementations may be used.

The wide-area network 254 may include one or more interconnected communication networks such as the Internet, a cable television distribution network, a satellite link network, a local area network, and a telephone network, as some non-limiting examples. By accessing the wide-area network 254, the vehicle 10 may be able to send outgoing data from the vehicle 10 to network destinations on the wide-area network 254 and receive incoming data to the vehicle 10 from network destinations on the wide-area network 254.

The base stations 256 may include system hardware configured to allow cellular transceivers of the vehicles 10 to access the communications services of the wide-area network 254. In an example, the base stations 256 may be part of a Global System for Mobile communication (GSM) cellular service provider. In another example, the base stations 256 may be part of a code division multiple access (CDMA) cellular service provider. The base stations 256 may support various different technologies and data speeds. For instance, the base stations 256 may support 3G, 4G LTE, and/or 5G communications technologies.

A mobile device 258 may be any of various types of portable computing device, such as cellular phones, tablet computers, smart watches, laptop computers, portable music players, or other devices capable of communication with the vehicle 10 over the wide-area network 254. The mobile device 258 may include one or more processors configured to execute computer instructions, and a storage medium on which the computer-executable instructions and/or data may be maintained.

A service delivery server 260 may include computing hardware configured to provide command and data services to the vehicles 10. These services may include, as some examples, remote control of the auxiliary power system 128, vehicle status information, and controls for other aspect of the vehicle such as turning the vehicle ON or OFF.

A remote command 252 is a message sent from the mobile device 258 over the wide-area network 254 to the service delivery server 260 to request an action to be performed by the vehicle 10. As some examples, the remote command 262 may be a request for the vehicle 10 to turn ON or OFF one or more of the sockets, reset or test a GFCI 136, remote start the vehicle 10, remote locking and unlocking of vehicle doors, and others.

A wake-up message 264 may be a SMS or other circuit-switched message sent to the vehicle 10 from the service delivery server 260. The wake-up message 264 may be sent responsive to receipt by the service delivery server 260 of the remote command 252. For instance, if the vehicle 10 is identified by the service delivery server 260 as being in low power mode (e.g., because a packet-switched connection over the wide-area network 254 between the vehicle 10 and the service delivery server 260 is not available), the service delivery server 260 may send the wake-up message 264 to the vehicle 10 that is the target of the remote command 252. Responsive to receipt of the wake-up message 264, the vehicle 10 may be configured to reestablish a packet-switched cloud connection with the service delivery server 260.

Once a packet-switched connection is available (or if the connection was already available), the service delivery server 260 may send a vehicle request 266 to the vehicle 10 requesting the vehicle 10 to perform the operation specified by the remote command 252. The vehicle 10 may receive the vehicle request 266 and send a vehicle response 268 to the service delivery server 260 in response. The vehicle response 268 may indicate a result of the command, such as whether the switch 134 was successfully turned ON or OFF, whether the GFCI 136 was successfully reset, or a status indicator, e.g., fuel level, current draw, etc. In turn, the service delivery server 260 may receive the vehicle response 268 and send a command response 270 to the mobile device 258 indicative of the information included in the vehicle response 268. The mobile device may then display the received vehicle information on a screen of the mobile device 258. In other embodiments, the mobile device may communicate with the vehicle using Bluetooth or other known communication techniques.

Figure 9:
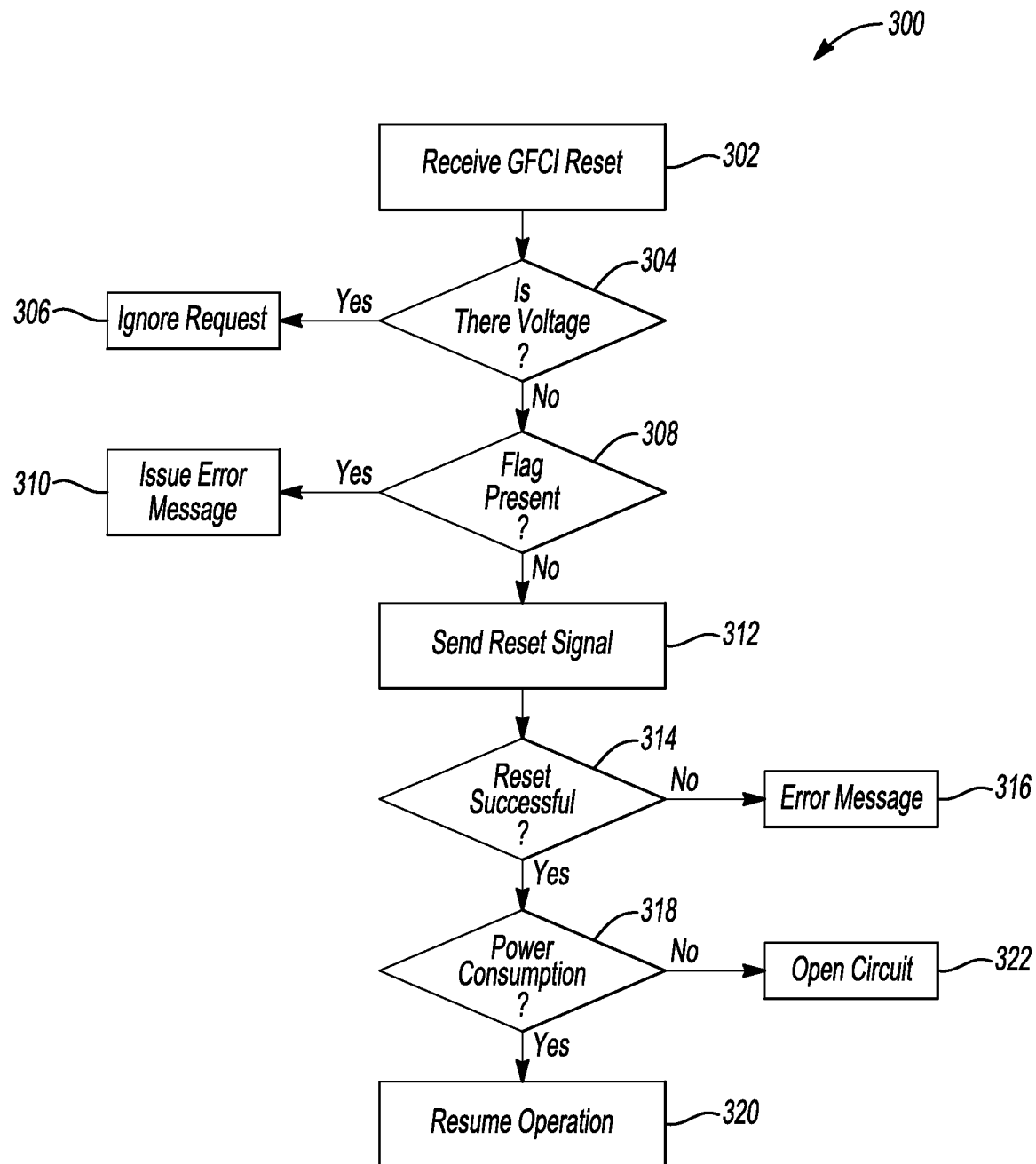
FIG. 9 is a flow chart illustrating controls/method for resetting a GFCI.

FIG. 9 is a flow chart illustrating a method/controls 300 for remotely resetting the GFCI 136 using the in-vehicle HMIs or a remote device such as a cell phone. Control logic or functions performed by controller 140 may be represented by flow charts or similar diagrams in one or more figures, such as in FIG. 9. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 140. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controls 300 began at operation 302 responsive to receiving a GFCI reset signal, which may be indicated by a user. At operation 304 the controller determines if there is voltage at the socket, e.g., socket 108. The controller may determine socket voltage by checking signals from a voltage sensor such as sensor 150. Voltage present at the socket indicates that the GFCI is active and does not need to be reset. As such, the request is ignored at operation 306. If there is no voltage at the socket control passes to operation 308 and the controller determines if a flag associated with the actuator arrangement is present. The controller may be configured to issue a flag responsive to the actuator being energized. The flag may be held in memory for a predetermined amount of time. The controls check for flags at operation 308 to determine if a reset was recently attempted. If a flag is present, a reset was recently requested and if not, a reset was not recently requested. The controls 300 are programmed to inhibit repeated resets of the GFCI. Thus, if a reset was recently attempted, i.e., a flag is present, controls pass to operation 310 and an error message is issued. The error message may indicate reset failed. Repeated tripping of the GFCI indicates an electrical issue that needs to be addressed by the user prior to the system resuming normal operation. If a flag is not present, controls pass to operation 312.

At operation 312, a reset signal is issued by the controller to command corresponding vehicle systems and components to effectuate resetting of the GFCI. The reset signal may be sent to a relay associated with the reset mechanism, e.g., relay 166. The relay, responsive to receiving the signal, closes to energize the actuator arrangement. For example, closing the relay may energize a solenoid that engages with a mechanical reset of the GFCI to reset the circuit breaker. The system then checks whether or not the GFCI has been successfully reset at operation 314. The system may determine successful reset by determining if voltage is available at the socket via a voltage sensor such as sensor 150. If voltage is not present, the reset may be unsuccessful or some other failure mode is present in the circuitry. An unsuccessful reset may prompt the system to provide one or more error messages at operation 316. The error message at 316 may be a generic message that simply states no power at socket, or more detailed diagnostics may be performed at operation 314 so that a detailed error message can be delivered to the user at operation 316. For example, the controller may determine if the lack of power at the socket is due to a tripped GFCI or if other portions of the circuitry are malfunctioning. A tripped GFCI may be determined by comparing circuitry voltage upstream and downstream of the GFCI. If voltage is present upstream of the GFCI but not downstream, then the GFCI is tripped or broken, indicating that the GFCI detected a ground fault, and a "ground fault" error message may be issued at operation 316. If voltage is not present upstream of the GFCI, e.g., at voltage sensor 146, indicating that the circuit is open and does not have power, then an "open circuit" error message may be issued at operation 316. The controller may also determine if the ON/OFF switch is malfunctioning by comparing voltage upstream and downstream of the ON/OFF switch. If voltage is present upstream of the switch and not downstream, the controller may issue an ON/OFF switch error message at operation 316. These are only example diagnostics and more or less may be present in other embodiments.

If the reset was successful, i.e., voltage is present downstream of the GFCI, control passes to operation 318 and the controller determines if there is power consumption at the outlet. The controller may determine power consumption by monitoring a current sensor, such as sensor 150. Current draw above a threshold indicates that the load, i.e., a pump, has resumed operation. The controller may issue a resumed operation message and send the message to a remote device at operation 320 to inform the user that the reset was successful. If power consumption is not sensed at operation 318 control passes operation 322 and an error message indicating tool is OFF or malfunctioning is sent to the remote device.

FIG. 10 illustrates an example human machine interface 350, which may be of an application running on an in-vehicle display or a remote device 352. The application may be a dedicated application for operating the power system 128 or may be part of a larger application for controlling many different aspects of the vehicle 10. The HMI 350 may be displayed on a touchscreen 354 of the remote device 352. The example page of the application is for operating two sockets (#1 and #2) that are independently controllable, e.g., each socket has its own ON-OFF switch, GFCI, timer, and electrical sensors configured output current and voltage.

Socket 1 may include an ON-OFF indicator 356 having an ON button 358, and an OFF button 360, i.e., capacitive touch. The indicator 356 may illuminate the ON button 358 and the OFF button 360 depending upon the activation state of the ON/OFF switch on the vehicle 10. Pressing the ON button causes the remote device to send a remote command to the service delivery server, which in turn, sends a vehicle request, including instructions to turn the ON/OFF switch to the ON position, to the vehicle controller. Upon receipt, the vehicle controller turns the ON/OFF switch to the ON position. Pressing the OFF button initiates a similar series of events.

The HMI may also include a GFCI reset button 362 for resetting the GFCI associated with socket 1. Pressing the GFCI reset button 362 may initiate the controls of FIG. 9 for example. The GFCI indicator may be green when active and red when tripped The HMI 350 may further include readings of current, voltage, and power for socket 1 in message box 364. A timer 366 may be provided for each of the sockets. The timer 366 allows a user to specify a predetermined run time for the sockets. For example, a user may program socket 1 to operate for 90 minutes using the application. The HMI 350 may display a countdown of the timer as well as be selectable to allow the user to stop, restart, or modify the timer 366. The system 128 may be programmed to open the ON/OFF switch 134 responsive to expiration of the timer. Socket 2 may include the same controls and indicators as socket 1. Additionally, in other embodiments the vehicle may include more than two sockets in which case the HMI may display information related to the additional sockets on the illustrated page or on other pages of the application that are not shown. The HMI 350 may also show a fuel indicator 368 that shows the amount of fuel left for the engine. The application may include additional pages that display other information and allow the user to actuate other vehicle systems. For example, other pages may indicate time to empty, total power consumption, power capacity, engine states, engine temperature, M/G temperature, battery state of charge, and diagnostic information. The application may be configured to pop-up warnings on one or more of the pages responsive to sense conditions. Example warnings include current exceeding a threshold, power draw exceeding a threshold, and fuel level dropping below a threshold. Other pages of the application may allow a user to input information such as socket priority, current limits, and power limits.

Each of the sockets have a predetermined upper current limit that is based on hardware of the vehicle 10. Each of the sockets may include a fuse or circuit breaker that de-energizes the socket when the current draw exceeds the upper current limit. For example, the 120-volt sockets may have a current limit of 20 amps and the 240-volt socket(s) may have a current limit of 30 amps.

The auxiliary power system 128 may allow a user to set a user-specified current limit (lower than the upper current limit) for each of the sockets using in-vehicle HMIs or the remote device. This gives a user greater control of the auxiliary power system. The user may set the user-specified current limit for one or more of the sockets by entering a value into the application running on the remote device. The remote device then sends the information to the vehicle controller 140, which stores the user-specified current limit. The controller 140 is programmed to compare a measured current draw on the socket to the user-specified current limit, and, responsive to the measured current exceeding the user-specified current limit, de-energize that socket.

Referring to FIG. 11, a flow chart 400 illustrates control methods for limiting one or more sockets to a user-specified current limit. At operation 402, the controller receives a user-specified current limit for one or more of the sockets. The user-specified current limit may be entered using a remote device, such as a cell phone, or via one or more in-vehicle HMIs such as a touchscreen of a radio head. The controller may tally the user-specified current limits to determine if a summation of the user-specify current limit exceeds an upper current threshold of the auxiliary power system. If the summation of user-specified current limits exceeds the threshold, a warning may be issued to inform the user that each of the sockets may not be operated at the user-specified current simultaneously. At operation 404, the controller measures current of the socket(s). The current may be measured using a sensor that is located on an electrical conduit leading to the socket as shown in FIG. 4. The measured current is compared to the user-specified current limit at operation 406. If any of the measured currents exceeds the user-specify current limits controls pass to operation 408, and if not control loops back to start. At operation 408 the controller commands the ON/OFF switch to the OFF position to de-energize sockets that are exceeding the limit.

In other embodiments, or as additional functionality of the above-described embodiment, the user-specified current limits may be used to trigger warnings as opposed to de-energization of the sockets. Here, the controller issues a warning responsive to a measured current exceeding the user-specify current limit.

Figure 12:
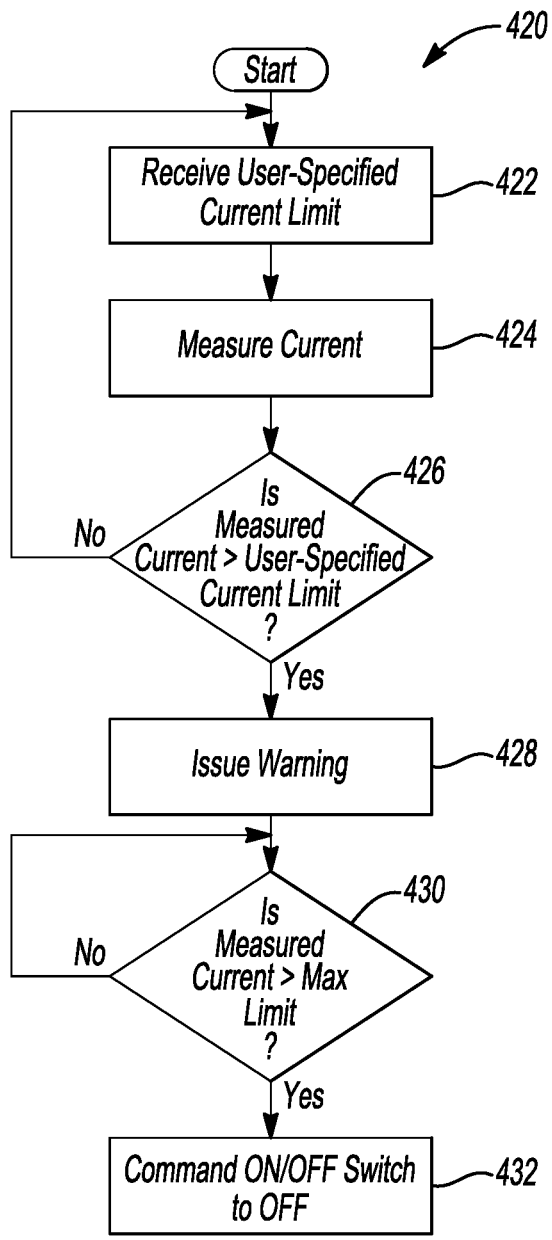
FIG. 12 is a flow chart illustrating controls/method for controlling setting current alerts for sockets of an auxiliary power system.

Referring to FIG. 12, a flow chart 420 illustrates control methods for issuing a warning when a socket exceeds a user-specified current limit. At operation 422, the controller receives a user-specified current limit for one or more sockets. The user-specified current limit may be entered using a remote device, such as a cell phone, or via one or more in-vehicle HMIs. At operation 424, the controller measures current of the socket. The measured current is compared to the user-specified current limit at operation 426. If the measured current exceeds the user-specify current limit controls pass to operation 428, and if not control loops back to start. At operation 428, the controller issues a warning for that socket. The warning may be displayed on the in-vehicle display or on the remote device. The warning may include visual and/or auditory prompts that indicate current of the socket exceeds the user-specify current limit. In addition to the warning, the application may ask the user if he would like to increase the current limit in response to the measured current exceeding the user limit.

At operation 430, the controller may determine if the measured current exceeds the upper current limit for the socket. If yes, control passes to operation 432 and the controller commands the ON/OFF switch to the OFF position to prevent damage to the hardware. Operations 430 and 432 are optional, and the vehicle may rely on circuit breakers or fuses to de-energize the sockets when the upper current limits are exceeded.

In addition to each socket having an upper current limit and the system having an upper current limit, the auxiliary system 128 as a whole has an upper power limit. Thus, a summation of the power draw at each of the sockets, i.e., a combined power draw of all sockets, cannot exceed the upper power limit. The upper power limit may be equal to the maximum power output of the hybrid powertrain or may be some lower threshold. The upper power limit may change based on operating conditions of the vehicle 10. For example, the upper power limit may be higher when the vehicle is parked and may be lower when the vehicle is being driven.

The vehicle controller 140 may monitor the power at each of the sockets, and de-energize one or more of the sockets via the ON/OFF switches, or other means, in response to the upper power limit being exceeded. The vehicle 10 may be preprogrammed to prioritize some sockets over others when the power limit is exceeded. For example, each of the sockets may be numbered, e.g., 1, 2, 3, etc., and the system may de-energize sockets in descending order. This allows a user to plug the most important load in socket 1 and other loads in the remaining sockets accordingly.

In some embodiments, a user may be able to prioritize the sockets. This gives the user greater control over which sockets they plug the loads into. Using a remote device or an in-vehicle HMI, the user can select the shut-off priority for the sockets. The controller is programmed to de-energize the sockets in descending order responsive to the upper power limit being exceeded. The controller may also be programmed to output power readings for the system to the displays and remote device so that the user can monitor the power usage versus the system capacity. For example, the displays may show a graph that illustrates the current power usage versus the upper power limit. The controller may also be programmed to output warnings related to power usage and issue notifications when sockets are de-energized due to the power draw exceeding the upper power limit.

Figure 13:
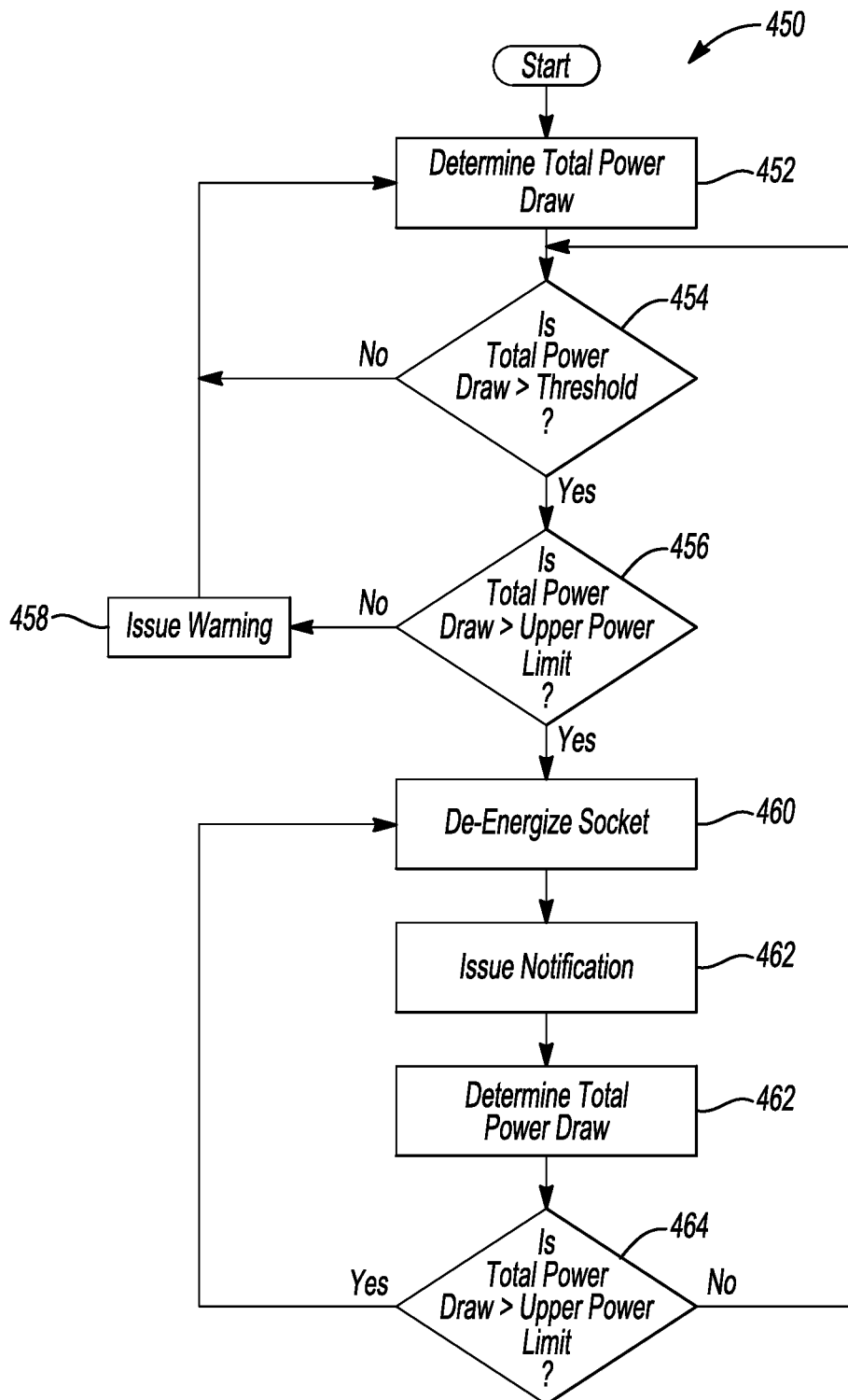
FIG. 13 is a flow chart illustrating controls/method for monitoring and limiting power draw of an auxiliary power system.

FIG. 13 illustrates example controls 450 for monitoring and protecting against power overdraw. At operation 452, the controller determines the total power draw on the auxiliary system. The total power draw is a summation of the power draws at each socket. At operation 454 the controller determines if the total power draw exceeds an intermediate threshold. The threshold is less than the upper power limit and serves as a warning to notify a user that they are approaching the upper power limit. The threshold may be a value between 70 and 95% of the upper power limit. If the power use exceeds the threshold at operation 454, controls pass to operation 456 and the controller determines if the total power draw exceeds the upper power limit.

If no at operation 456, a warning is issued at operation 458. The warning may be displayed on the in-vehicle displays as well as on connected remote devices. The warning may be visual, auditory, or haptic. The warning may include text stating that the power draw is approaching the upper power limit. The warning may also include the power draw readings for each of the sockets to aid the user in determining which loads to unplug.

If yes at operation 456, control passes to operation 460 and at least one of the sockets is de-energized. As explained above, the system may include pre-programmed socket priority or may have a user-defined socket priority. If so, the lowest-priority socket is de-energized first and, if that is insufficient, additional sockets are de-energized. Sockets may be de-energized by commanding the ON/OFF switch associated with socket to the OFF position.

At operation 462 the controller re-determines total power draw following de-energization of one or more of the sockets, e.g., lowest-priority socket, at operation 460. At operation 464, the controller determines if de-energizing that socket reduced the total power draw below the upper power limit. If power draw is below the upper limit, control loops back and the controller continues to monitor the power usage. If the power draw exceeds the upper limit, control goes back to operation 460 and an additional socket, e.g., second-lowest-priority socket, is de-energized. Controls loop between operations 460 and 464 until the total power draw is less than the upper power limit.

In addition to having exemplary processes executed by a vehicle computing system located in a vehicle, in certain embodiments, the exemplary processes, or portions thereof may be executed by a computing system in communication with a vehicle computing system. Such a system may include, but is not limited to, a wireless device (e.g., a cell phone) or a remote computing system (e.g., a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid vehicle comprising:
a power bus electrically connected to an inverter;
an electrical socket electrically connected to the power bus;
a ground fault circuit interrupter (GFCI) electrically connected between the power bus and the socket, the GFCI including a circuit breaker having a mechanical reset;
an actuator arrangement configured to actuate the mechanical reset to reset the circuit breaker;
a traction battery electrically connected to the inverter;
an electric machine electrically connected to the inverter and configured to receive power from the traction battery; and
a gearbox coupled to the electric machine.

2. The hybrid vehicle of claim 1, wherein the actuator arrangement includes an electric actuator.

3. The hybrid vehicle of claim 2, wherein the electric actuator is an electric motor.

4. The hybrid vehicle of claim 2, wherein the mechanical reset includes a toggle that is pivoted to reset the circuit breaker, and the actuator arrangement further includes an arm drivably connected to the electric actuator and engageable with the toggle to pivot the toggle and reset the circuit breaker.

5. The hybrid vehicle of claim 4, wherein the actuator arrangement further includes a reciprocating mechanism drivably connecting the arm to the electric actuator.

6. The hybrid vehicle of claim 2, wherein the electric actuator is a solenoid that includes an arm configured to engage the mechanical reset.

7. The hybrid vehicle of claim 1, wherein the mechanical reset includes a toggle that is pivoted to reset the circuit breaker, and the actuator arrangement further includes an electric motor having an output shaft with an output plate attached thereto, an arm pivotal to engage with the toggle, and a rod having a first end eccentrically connected to the plate and a second end slidable attached to the arm.

8. The hybrid vehicle of claim 7, wherein the second end is slidable attached to the arm by a sleeve that is received on the arm and attached to the second end.

9. The hybrid vehicle of claim 1 further comprising a truck box, wherein the outlet is disposed on the truck box.

10. A hybrid vehicle comprising:
a power bus electrically connected to an inverter;
a traction battery electrically connected to the inverter;
an electric machine electrically connected to the inverter and configured to receive power from the traction battery;
an electrical socket electrically connected to the power bus; and
a ground fault circuit interrupter (GFCI) electrically connected between the power bus and the socket;
an actuator configured to reset the GFCI; and
a controller programmed to, responsive to a request to reset the GFCI, command the actuator to reset the GFCI.

11. The hybrid vehicle of claim 10, wherein the controller is further programmed to receive the request to reset the GFCI from a remote device.

12. The hybrid vehicle of claim 10, wherein the controller is further programmed to, responsive to (i) the actuator being commanded to reset the GFCI and (ii) voltage not being detected at the socket, issue an error message.

13. The hybrid vehicle of claim 12, wherein the error message is embedded in a wireless signal output from the vehicle to a remote device.

14. The hybrid vehicle of claim 10, wherein the controller is further programmed to, responsive to (i) the actuator being commanded to reset the GFCI, (ii) voltage being detected at the outlet, and (iii) power consumption at the outlet being below a threshold, issue an error message.

15. The hybrid vehicle of claim 14, wherein the error message is indicative of a load malfunction.

16. The hybrid vehicle of claim 10, wherein the controller is further programmed to output a signal to a remote device responsive to the GFCI being tripped.

17. A hybrid vehicle comprising:
a power bus electrically connected to an inverter;
a socket electrically connected to the power bus; and
a ground fault circuit interrupter (GFCI) electrically connected between the power bus and the socket and including a mechanical reset;
an actuator arrangement configured to operate the mechanical reset, wherein the actuator arrangement includes an electric actuator having an arm engageable with the mechanical reset; and
a controller programmed to, responsive to a request to reset the GFCI, command the actuator arrangement to operate the mechanical reset, and wherein the command the actuator arrangement further includes energizing the electric actuator.

18. The hybrid vehicle of claim 17, wherein the electric actuator is a solenoid or an electric motor.

19. The hybrid vehicle of claim 17 further comprising:
a traction battery electrically connected to the inverter; and
an electric machine electrically connected to the inverter and configured to receive power from the traction battery.

20. The hybrid vehicle of claim 19 further comprising a gearbox coupled to the electric machine.

* * * * *